United States Patent
Mohat

[19]

[11] Patent Number: 5,764,660
[45] Date of Patent: Jun. 9, 1998

[54] PROCESSOR INDEPENDENT ERROR CHECKING ARRANGEMENT

[75] Inventor: William D. Mohat, Mentor, Ohio

[73] Assignee: Elsag International N.V., Amsterdam, Netherlands

[21] Appl. No.: 890,278

[22] Filed: Jul. 9, 1997

Related U.S. Application Data

[63] Continuation of Ser. No. 574,088, Dec. 18, 1995, abandoned.

[51] Int. Cl.[6] ............................................. G06F 11/00
[52] U.S. Cl. ............................ 371/68.1; 395/182.08
[58] Field of Search .............................. 371/68.2, 68.1, 371/47.1; 395/182.08, 182.09, 182.1, 182.11, 183.07, 183.2

[56] References Cited

U.S. PATENT DOCUMENTS

| | | | |
|---|---|---|---|
| 4,030,074 | 6/1977 | Giorcelli | 364/200 |
| 4,049,957 | 9/1977 | Kera et al. | 371/68.3 |
| 4,251,873 | 2/1981 | Joby | 371/68.3 |
| 4,456,952 | 6/1984 | Mohrman et al. | 364/200 |
| 4,907,228 | 3/1990 | Bruckert et al. | 371/68.3 |
| 5,136,595 | 8/1992 | Kimura | 371/68.3 |

*Primary Examiner*—Robert W. Beausoliel, Jr.
*Assistant Examiner*—Trinh L. Tu
*Attorney, Agent, or Firm*—Michael M. Rickin

[57] ABSTRACT

A dual processor computer system with error checking that stops immediately when a discrepancy is detected between the two processors. The system includes a first processor for executing a series of instructions including input/output instructions. A second processor executes the same instructions independently of and in synchronization with the first processor. Both processors have a processor independent bus interface. All significant processor address, data, and control signals are connected to all peripheral devices by a processor independent I/O bus. A comparison circuit detects discrepancies in the operation of the two lock step processors and provides a signal that immediately stops operation of the processors when an error is detected. Each processor is connected through its associated processor independent bus interface to the comparison circuit and the first processor is also connected through its interface to the I/O bus. The I/O bus is independent of the processor type, clock rate, and peripherals chosen in the construction of the computing system. This independence allows the computing system to be upgraded with faster processors and newer peripherals, without having to redesign the error checking circuitry.

10 Claims, 1 Drawing Sheet

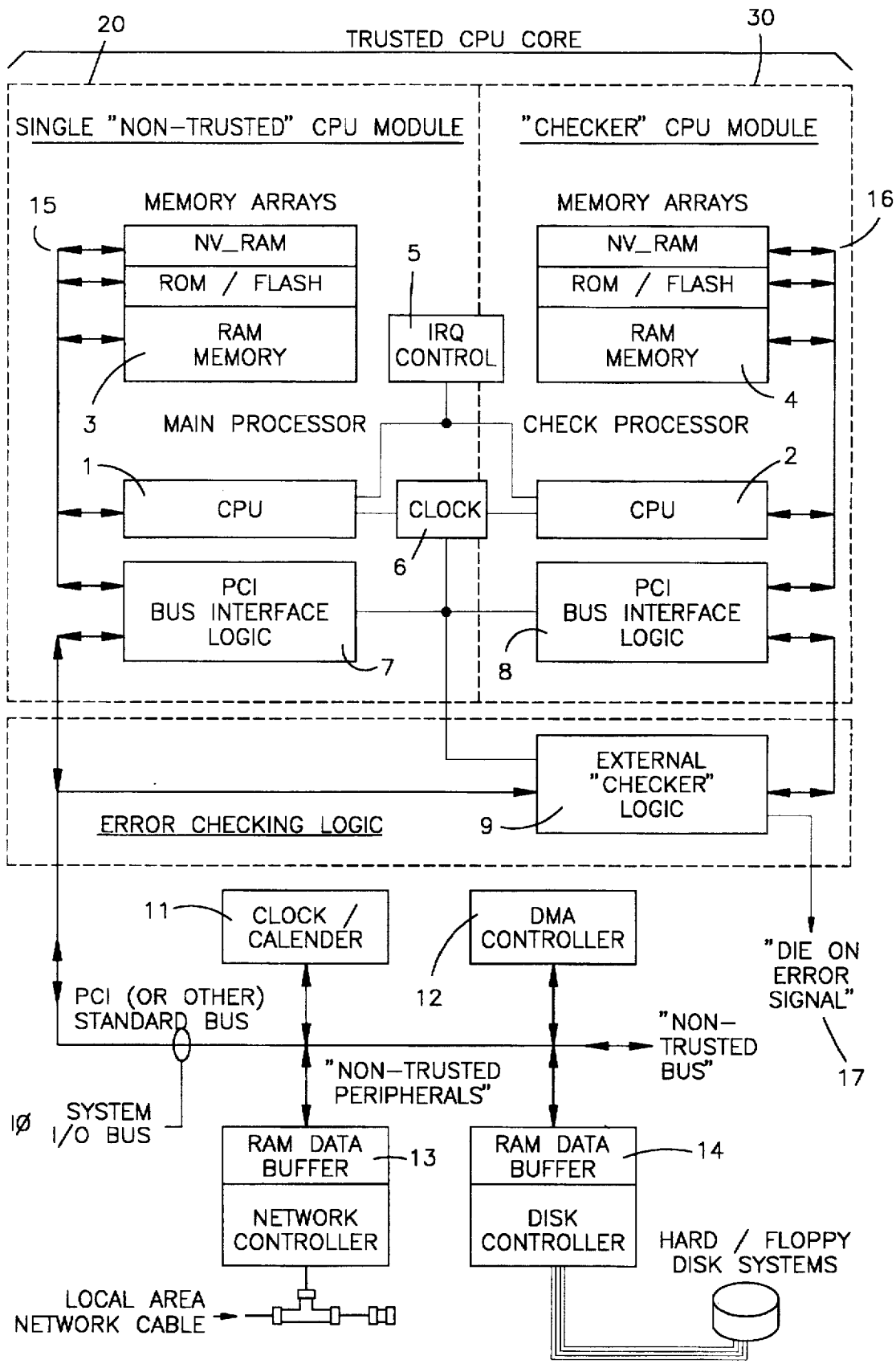

PROCESSOR INDEPENDENT ERROR CHECKING ARRANGEMENT

This is a continuation of application Ser. No. 08/574,088 filed on Dec. 18, 1995, now abandoned.

FIELD OF THE INVENTION

This invention relates to computing systems, and more particularly, to fault detection in a processor system using dual processors and a comparison arrangement for error detection.

2. Description of the Prior Art

Computing integrity, or the ability to detect a incorrectly functioning computing system, is important in many areas of computer applications. This is especially true when a undetected failure in the computing platform could result in extensive loss of property or loss of life. Air traffic control, weapons guidance and control systems, and industrial process control systems are application examples in which errors in processing could have catastrophic effects.

There have been many advances in fault-tolerant system software in recent years. These software systems attempt to make two or more computers appear to the end user as a single system which is more reliable (or "available") than a single system alone. However, these software systems rely on the underlying computer hardware behaving in a "fail stop" manner. That is, they assume that any fault in the computer hardware will be immediately detected, and that the system will immediately stop before delivering any erroneous data. Despite advances in software techniques for error detection, this "fail stop" behavior can still only be achieved with a custom computing platform with advanced hardware error detection included. Such hardware systems are usually difficult to design and expensive to produce.

A common hardware technique for detecting faults occurring in a processor is to utilize an identical processor in "lock step" operation with the primary processor and to continuously compare all outputs and control signals of the identical pair. Lock step operation is generally provided by having a processor pair clocked by a common source, so that they will process identical instructions on the same clock cycles. If a disagreement occurs between the two processors, the processor system comprising the pair is immediately halted.

In computing platforms based on the prior art, the error detection function is provided by a hardware comparison circuit, which is designed around the bus timing and electrical interfaces of the central processor units. Then, all input/output devices must be designed to interface to this custom, synchronized bus interface. The result of this design approach is that the resulting system is locked into a specific central processor unit, since the comparison logic and input/output systems are custom designed with electrical interfaces that are unique to a single processor. This makes system upgrades a extremely costly proposition, from both a financial and development time perspective.

One example of a system that is extremely costly to upgrade is described in U.S. Pat. No. 4,907,228. The system described in this patent does not use an input/output (I/O) bus structure, such as Peripheral Component Interconnect (PCI) bus, NuBus, ISA bus, TurboChannel, S-Bus, EISA bus, FutureBus, etc., which are independent of the central processing unit. Therefore, the system is unique to the processors used therein. Another example of such a system is described in U.S. Pat. No. 5,136,595. The system described in this patent is designed around those microprocessors that operate in the functional redundancy mode and therefore is microprocessor dependent. The system does not provide any protection against memory errors as there is shown and described only one memory system and two microprocessors. Further the system does not make use of any standard, that is, processor independent, I/O bus structure.

Therefore, it is desirable to have a comparison circuit or error checker logic that is not tied to any specific processor or chip set family. It is further desirable that the comparison circuit make use of an I/O bus that is independent of the processor. It is also desirable for the synchronized microprocessors to be compatible with the processor independent I/O bus. This compatibility with a processor independent I/O bus allows the microprocessors to be upgraded without redesigning the error checker logic. In addition, the use of a standard processor independent I/O bus allows the resulting system to make use of commercial "off the shelf" input/output peripheral modules, resulting in a much lower total system cost.

SUMMARY OF THE INVENTION

An error detecting computing system that has a first processor and associated bus interface of a predetermined kind that is compatible with a processor independent input/output (I/O) bus of a predetermined type, and a second processor and associated bus interface of the predetermined kind. The processors are operating in lock step with each other.

The system further has an error checker subsystem for determining the occurrence of any disagreement between the processors on data transfer to the predetermined type of processor independent I/O bus. Upon such an occurrence the subsystem stops operation of the processors.

The first processor is connected through its associated bus interface to the error checker subsystem and the second processor is connected through its associated bus interface to the error checker subsystem. The connection provided by the first and second bus interfaces allows both of the processors and both of the associated bus interfaces to be upgraded. Upgrading is accomplished by removing both of the processors and both of the associated bus interfaces and replacing each of the removed processors and removed associated bus interfaces with a processor and an associated bus interface of another predetermined kind that is also compatible with predetermined type of I/O bus. The upgrading occurs without having to replace the error checker subsystem with an error checker subsystem that is compatible with the processors and associated bus interfaces of another predetermined kind.

DESCRIPTION OF THE DRAWING

The only drawing FIGURE shows a block diagram which illustrates the architecture of one embodiment of the present invention.

DESCRIPTION OF THE PREFERRED EMBODIMENT(S)

Referring to the drawing FIGURE, a very high integrity fault detecting processor architecture is illustrated including a primary processor 20 and a "checking" processor 30. The primary processor 20 is comprised of a CPU 1, a memory system 3, address, data and control busses 15, and a bus interface 7. The checking processor 30 is comprised of a CPU 2, a memory system 4, address, data and control busses 16, and a bus interface 8. Both of these processors can be implemented using commodity microprocessors and support "chip sets" such as the 80×86 family of microprocessors manufactured by Intel and the Power PC/CHRP (common hardware reference platform) compliant system components and platforms. As such, either of these processors alone (with some input/output devices) would appear identical to many standard "desktop computing platforms" that are commercially available.

The primary processor 20, by itself, contains only the same limited amount of error detection circuitry, such as parity checking on RAM memory, that is common to desktop computing platforms. Because of this, it is considered a single, "non-trusted" CPU. That is, it cannot be relied upon not to deliver erroneous data when a system fault occurs, since its amount of error detection logic is limited.

The checker processor 30 is added to the primary processor 20, in such a way as to produce synchronous, "lock step" execution of instructions. This is done by providing a common clock 6, a synchronizing interrupt controller 5, and connecting the bus interfaces 7, 8 to run off of the common clock. The synchronizing interrupt controller 5 ensures that processors 20 and 30 receive interrupts simultaneously.

The bus interfaces 7, 8 can be any one of a number of popular microprocessor bus systems. The PCI bus is shown in the drawing FIGURE, but the invention will work equally well with NuBus, ISA bus, TurboChannel, S-Bus, EISA bus, FutureBus, or any other I/O electrical interface. It should be noted that it is the addition of common clock 6 and synchronizing interrupt controller 5 that permits the use of standard bus interfaces, thereby allowing the present invention to make use of VLSI interface logic provided by the microprocessor vendors.

The present invention also includes checker logic 9 and processor independent I/O bus 10. The checker logic 9 is added external to the processor pair 20, 30, and as shown in the FIGURE is electrically connected at the bus interfaces 7, 8, not directly to the microprocessor system busses (15, 16) as is common in the prior art. As is also shown in the FIGURE, the checker logic 9 is electrically connected to the processor independent I/O bus 10. Further, by employing an industry standard input/output bus system 10, the resulting computing platform can make use of many standard microcomputer peripherals which are widely available at very low cost. Clock/calendar 11, DMA controller 12, RAM data buffers 13 and 14 are shown in the drawing FIGURE as examples of such peripherals.

The checker logic 9 is designed only to monitor the operation of the two processors. The primary processor's address, data, and control busses connect to the checker logic, as do the busses from the checker processor. Only the address, data, and control lines from the primary processor are connected directly to the processor independent I/O bus 10. The checker processor's lines are only connected to the checker logic and not directly to any other devices such as the standard peripherals 11-14.

The functions provided by the checker logic are:

1) to verify that the two processors agree on all addresses and data to be written to devices that are connected to the processor independent I/O bus 10;

2) to synchronize all data coming from the processor independent I/O bus, so that both processors are presented with identical data sets; and 3) to assert a "die on error" signal 17 on any disagreement between the address, data and control lines of the processors 20 and 30. The die on error signal 17 immediately stops operation of the processors when an error is detected.

The combination of the two processors and the checker logic forms a "trusted CPU core", since the resulting system can now be relied upon to stop operation immediately when any discrepancy is detected. It should be noted that all input/output devices are all considered "non-trusted" resources, since there is no hardware error checking provided on these devices. However, recent advances in software-based error detection algorithms can provide an extremely high degree of fault detection for these devices. This is possible, since the software itself is running on a "trusted" computing platform.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. An error detecting computing system comprising:

(a) a first processor and associated bus interface of a predetermined kind that is compatible with a processor independent input/output (I/O) bus of a predetermined type;

(b) a second processor and associated bus interface of said predetermined kind;

(c) said first and second processor operating in lock step with each other; and (d) an error checker subsystem for determining the occurrence of any disagreement between said first and second processors on data transfer to said I/O bus of said predetermined type and stopping operation of said processors upon said occurrence, said first processor connected through said associated bus interface to said error checker subsystem, and said second processor connected through said associated bus interface to said error checker subsystem, said connection provided by said first and second bus interfaces allowing both of said first and second processors and both of said associated bus interfaces to be upgraded by removing both of said first and second processors and both of said associated bus interfaces and replacing each of said removed processors and said removed associated bus interfaces with a processor and an associated bus interface of another predetermined kind that is also compatible with said I/O bus of said predetermined type without having to replace said error checker subsystem with an error checker subsystem that is compatible with said processors and associated bus interfaces of another predetermined kind.

2. The system of claim 1 wherein a common clock and synchronizing interrupt controller are connected to said first and second processors to provide said lock step operation of said processors.

3. The system of claim 1 wherein said first processor is also connected through said associated bus interface to said processor independent I/O bus of said predetermined type.

4. An error detecting computing system comprising:

(a) a processor independent input/output (I/O) bus of a predetermined type;

(b) first and second processors each comprising a bus interface of a predetermined kind that is compatible with said processor independent I/O bus of said predetermined type, said processors operating in lock step operation with each other; and (c) an error checker subsystem for determining the occurrence of any disagreement between said first and second processors on data transfer to said processor independent I/O bus of said predetermined type and stopping operation of said processors upon said occurrence, said first processor connected through said first processor bus interface to said error checker subsystem, and said second processor connected through said second processor bus interface to said error checker subsystem said connection provided by said first processor and said second processor bus interfaces allowing both of said first and second processors and both of said first processor and said second processor bus interfaces to be upgraded by removing both of said first and second processors and both of said bus interfaces and replacing each of said removed processors and said removed bus interfaces with a processor and an associated bus interface of another predetermined kind that is also compatible with said processor independent I/O bus of said predetermined type without having to replace said error checker subsystem with an error checker subsystem that is compatible with said processors and associated bus interfaces of another predetermined kind.

5. The system of claim 4 wherein a common clock and synchronizing interrupt controller are connected to said first and second processors to provide said lock step operation of said processors.

6. The system of claim 4 wherein said first processor is also connected through said first processor bus interface to said processor independent I/O bus of said predetermined type.

7. A method for providing trusted computing for a computing system comprising two processors operating in lock step with each other, both of said processors having an associated bus interface, each of said processors and said associated bus interface of a predetermined kind that is compatible with a processor independent input/output (I/O) bus of a predetermined type, said method comprising the steps of:

(a) connecting each of said processors through said associated bus interface to an error checker subsystem for determining the occurrence of any disagreement between said processors on data transfer to said I/O bus of said predetermined type; and (b) stopping operation of said processors upon said occurrence, said connection provided by said first and second bus interfaces allowing both of said first and second processors and both of said associated bus interfaces to be upgraded by removing both of said first and second processors and both of said associated bus interfaces and replacing each of said removed processors and said removed associated bus interfaces with a processor and an associated bus interface of another predetermined kind that is also compatible with said I/O bus of said predetermined type without having to replace said error checker subsystem with an error checker subsystem that is compatible with said processors and associated bus interfaces of another predetermined kind.

8. The method of claim 7 further including the step of connecting a common clock and synchronizing interrupt controller to both of said processors to provide said lock step operation of said processors.

9. The method of claim 7 further including the step of connecting one of said processors through its associated bus interface to said processor independent (I/O) bus of said predetermined type.

10. A method for providing trusted computing for two processors each of which has an associated bug interface, each of said processors and said associated bus interface of a predetermined kind that in compatible with a processor independent input/output (I/O) bus of a predetermined type, said method comprising the steps of:

(a) connecting one of said processors through its associated bus interface to said processor independent (I/O) bus of said predetermined type;

(b) connecting a common clock and synchronizing interrupt controller to both of said processors to provide lock step operation of said processors; and (c) connecting each of said processors through said associated processor independent bus interface to an error checker subsystem for determining the occurrence of any disagreement between said processors on data transfer to said processor independent I/O bus of said predetermined type and stopping operation of said processors upon said occurrence, said connection provided by said first and second bus interfaces allowing both of said first and second processors and both of said associated bus interfaces to be upgraded by removing both of said first and second processors and both of said associated bus interfaces and replacing each of said removed processors and said removed associated bus interfaces with a processor and an associated bus interface of another predetermined kind that is also compatible with said I/O bus of said predetermined type without having to replace said error checker subsystem with an error checker subsystem that is compatible with said processors and associated bus interfaces of another predetermined kind.

\* \* \* \* \*